April 4, 1939.  E. A. HEYN  2,153,468
LOAD DISTRIBUTING, AUXILIARY POWER, DUO SEMI-TRAILER TRACTOR
Filed June 14, 1937
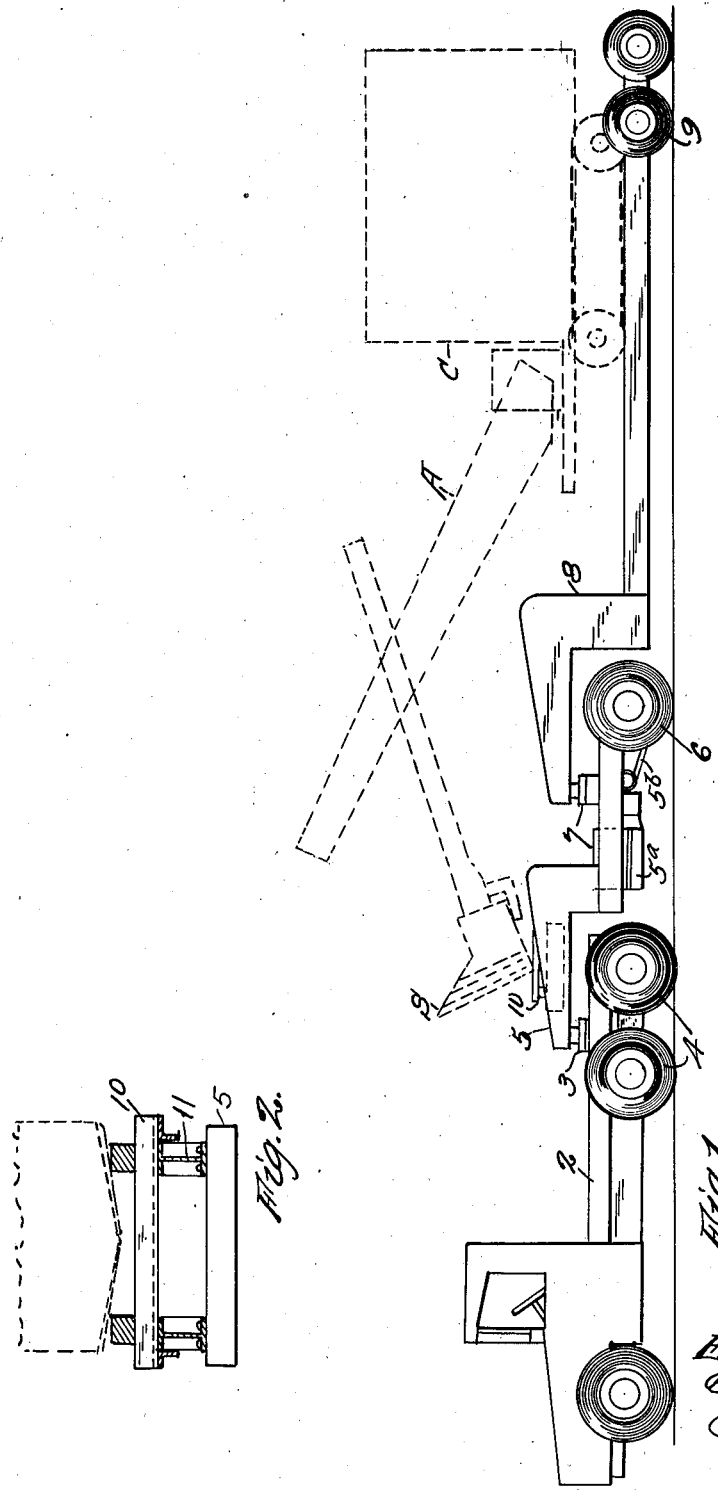

Patented Apr. 4, 1939

2,153,468

UNITED STATES PATENT OFFICE 2,153,468

LOAD DISTRIBUTING, AUXILIARY POWER, DUO SEMI-TRAILER TRACTOR

Ernest A. Heyn, Los Angeles, Calif.

Application June 14, 1937, Serial No. 148,136

2 Claims. (Cl. 180—14)

This invention is a tractor, duo-semi-trailer combination for general highway transportation of heavy and elongate load bodies.

In the transportation of freight or other heavy loads over public highways the load must be distributed over a number of vehicle wheels under laws and regulations fixing the load per wheel.

An object of this invention is to provide not only for the greater distribution of the vehicle load to various wheels, but further to provide for the division of the load weight of the body itself onto different units of a multi-unit tractor train instead of placing all of the load body directly on one train unit to be distributed therefrom to coupled units.

Also an object is to provide for the effective direct imposition of the load body onto different units of the tractor train, and to provide means to facilitate the operation of the train in making road or other necessary turns in travel and handling of the train.

Further, an object is to provide increased power-traction points or driven wheel means in road tractors having a leading tractor and semi-trailer units; that is one or more units so hitched to one another or to the tractor as to vertically impose a part of a given load on its leader.

To these purposes the invention comprises a leader tractor and semi-trailer units at least one of which has an auxiliary power plant and which unit is designed for direct imposition of the load body, and comprises, also, means for facilitating turning traverse of the train; particularly when the load body is of elongate form.

The invention consists of the advancements in this art as set forth in the ensuing disclosure and having, with the above, additional objects and advantages as hereinafter developed, and whose construction, combination and details of means, and the manner of operation will be made manifest in the description of the herewith illustrated embodiment of the invention; it being understood that modifications, variations and adaptations may be resorted to within the scope, principle and spirit of the subjoined claims.

Figure 1 is a diagrammatic side elevation of the tractor-train.

Figure 2 is a transverse, sectional detail of a sliding bed device for the contiguous end of an elongate load body imposed on the vehicle.

A suitable, leader tractor 2 is provided with an appropriate type of fifth wheel or connection 3 preferably forward of the axle of its rear wheel or axis of the wheel group 4, as the case may be. Attached to this fifth wheel device is the overhanging, forward end of a suitable frame 5 which is supported at its opposite or rear end on a suitable wheel means 6. This constitutes an auxiliary, semi-trailer unit and has, forward of its rear wheel means 6 a fifth wheel device 7 of suitable type in the same plane and of the same type as the fifth wheel 3 on the tractor 2.

To the auxiliary unit hitch or fifth wheel 7 there is attached the forward, overhanging end of a suitable frame 8 provided with a suitable rear end load wheel system 9, whereby to form a semi-trailer having its front end vertically transferring a part of an applied load onto the auxiliary section 5, which by reason of its vertical imposition onto the leader tractor 2 acts to transfer part of the load it (the auxiliary section 5) receives from the third section or semi-trailer 8. It will be seen that the two sections 5 and 8 form duo-semi-trailer units in the train so connected as to deliver a part of the body load on the second unit 8 by the intermediate unit 5 to the tractor 2 at a point materially in advance of the axle center of its rear wheel device 4.

A feature of the present invention is to provide for the direct placement of a part of the load body, such as a very large and heavy excavator shown in dotted lines Fig. 1, on the intermediate or auxiliary unit 5, as by freely lowering the heavy scoop S onto unit 5, while the cab C and the crane arm A are supported on the semi-trailer 8.

To that end and to provide for ready turning of the connected tractor and trailer sections 5 and 8, there is mounted on the section 5 a bed frame 10 slidable on guide rails 11 extending longitudinally of and fixed on the overhanging end of the semi-trailer section 5. Thus, in the case of such elongated load bodies not only is a part of the load vertically imposed forwardly of the rear wheel support of the auxiliary or intermediate, semi-trailer section or unit 5, but the movable supporting bed thereon automatically compensates for angular movement of the steerably connected sections 5 and 8.

Such a direct vertical imposition of load body directly on the semi-trailer sections 5 and 8 is of very great importance in apparatus of this class where the structure is intended to be loaded with bodies which may readily involve a weight of as much as seventy-five tons. In the case here illustrated, as much as ten or more tons are removed from the section 8 by placing it directly on the intermediate section 5 for loading the wheels 4 and 6, and avoiding that much on the unit or section 8.

Another feature of the invention is the provision of additional drive wheel means in the semi-trailer system following the tractor 2. In the present embodiment the auxiliary, semi-trailer section 5 is provided with a motor 5ª having suitable transmission connection 5ᵇ with the road wheels 6; it being understood that the motor 5ª may be of any suitable type and under control of the operator in the cab of the leader tractor 2. Thus the unit 5 is not only an auxiliary, semi-trailer for direct load body support but is also an auxiliary drive or power plant in the train.

What is claimed is:

1. A highway tractor train having a leader tractor, a train end semi-trailer, and an intermediate, auxiliary, semi-trailer with a connection hitching its forward end to the tractor at a point forward of the wheel group axis of the tractor to distribute vertical load to the fore and aft wheel system of the tractor, and the end semi-trailer having a hitch connecting it to the intermediate auxiliary at a point forward of the axis of its rear end supporting wheels to distribute vertical load to the fore and aft supports of the auxiliary so that each element of the train vertically receives a share of the load carried by the end semi-trailer to be transferred to the entire train wheel system; said intermediate auxiliary having a bed for direct reception of part of the load object carried by the rear-end semi-trailer: the load object forming no draft connection in the train.

2. A highway tractor as set forth in claim 1, and in which the bed is arranged at a point contiguous to the front end supports of the intermediate auxiliary and provides for a shift of the point of load application.

ERNEST A. HEYN.